(12) United States Patent  
Veit

(10) Patent No.: US 7,798,399 B2
(45) Date of Patent: *Sep. 21, 2010

(54) ORGANIZATIONAL SETTINGS FOR A PRICE PLANNING WORKBENCH

(75) Inventor: Thomas Veit, Kirchheimbolanden (DE)

(73) Assignee: SAP Aktiengesellschaft, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 12/135,061

(22) Filed: Jun. 6, 2008

(65) Prior Publication Data

US 2008/0243578 A1  Oct. 2, 2008

Related U.S. Application Data

(63) Continuation of application No. 11/074,586, filed on Mar. 8, 2005, now Pat. No. 7,383,990.

(60) Provisional application No. 60/563,284, filed on Apr. 16, 2004, provisional application No. 60/551,221, filed on Mar. 8, 2004.

(51) Int. Cl.
G06K 15/00 (2006.01)

(52) U.S. Cl. .................... 235/383; 235/375

(58) Field of Classification Search ............ 235/383, 235/378, 375, 376; 705/5, 400, 20
See application file for complete search history.

(56) References Cited

U.S. PATENT DOCUMENTS

| 5,400,253 A | 3/1995 | O'Connor |
| 5,758,327 A | 5/1998 | Gardner et al. |
| 5,873,069 A | 2/1999 | Reuhl et al. |
| 5,930,771 A | 7/1999 | Stapp |
| 5,974,418 A | 10/1999 | Blinn et al. |
| 6,076,071 A | 6/2000 | Freeny, Jr. |

(Continued)

FOREIGN PATENT DOCUMENTS

JP  2004-30343 A  1/2004

(Continued)

OTHER PUBLICATIONS

U.S. Appl. No. 60/374,892, filed Apr. 22, 2002, Krajec.

(Continued)

*Primary Examiner*—Karl D. Frech
(74) *Attorney, Agent, or Firm*—Foley & Lardner LLP

(57) ABSTRACT

A method for defining a price planning schedule according to one or more organization settings. The method includes receiving a first organization setting for at least one article. The first organization setting is configured to be a default organization setting. The method also includes receiving a pricing level for the first organization setting for the at least one article and receiving at least a second organization setting for the at least one article. Further, the method includes receiving a second pricing level for the second organization setting and generating a first price planning schedule based on the first organization setting and the second organization setting for the at least one article. The method also includes receiving a pricing signal from a slow seller management system and adjusting at least one of the pricing level and the second pricing level based on the pricing signal. The method includes generating a second price planning schedule based on adjusting at least one of the pricing level and the second pricing level.

19 Claims, 7 Drawing Sheets

U.S. PATENT DOCUMENTS

| | | | |
|---|---|---|---|
| 6,151,608 A | 11/2000 | Abrams | |
| 6,272,472 B1 | 8/2001 | Danneels et al. | |
| 6,484,149 B1 | 11/2002 | Jammes et al. | |
| 6,507,851 B1 | 1/2003 | Fujiwara et al. | |
| 6,513,016 B1 | 1/2003 | Freeny, Jr. | |
| 6,553,352 B2 | 4/2003 | Delurgio et al. | |
| 6,609,101 B1 | 8/2003 | Landvater | |
| 6,678,695 B1 | 1/2004 | Bonneau et al. | |
| 6,910,017 B1 | 6/2005 | Woo et al. | |
| 6,980,966 B1 | 12/2005 | Sobrado et al. | |
| 7,080,066 B1 | 7/2006 | Scheurich et al. | |
| 7,085,734 B2 | 8/2006 | Grant et al. | |
| 7,092,929 B1 | 8/2006 | Dvorak et al. | |
| 7,117,165 B1 | 10/2006 | Adams et al. | |
| 7,139,731 B1 | 11/2006 | Alvin | |
| 7,155,402 B1 | 12/2006 | Dvorak | |
| 7,240,019 B2 | 7/2007 | Delurgio et al. | |
| 7,249,033 B1 | 7/2007 | Close et al. | |
| 7,251,615 B2 | 7/2007 | Woo | |
| 7,308,421 B2 | 12/2007 | Raghupathy et al. | |
| 7,373,314 B2 | 5/2008 | Aliabadi et al. | |
| 7,379,890 B2 | 5/2008 | Myr et al. | |
| 7,383,990 B2 * | 6/2008 | Veit | 235/383 |
| 2001/0039519 A1 | 11/2001 | Richards | |
| 2002/0023500 A1 | 2/2002 | Chikuan et al. | |
| 2002/0026368 A1 | 2/2002 | Carter, III | |
| 2002/0078159 A1 | 6/2002 | Petrogiannis et al. | |
| 2002/0087583 A1 | 7/2002 | Morgan et al. | |
| 2002/0107713 A1 | 8/2002 | Hawkins | |
| 2002/0116348 A1 | 8/2002 | Phillips et al. | |
| 2002/0147668 A1 | 10/2002 | Smith et al. | |
| 2002/0184116 A1 | 12/2002 | Tam et al. | |
| 2003/0023500 A1 | 1/2003 | Boies et al. | |
| 2003/0028437 A1 | 2/2003 | Grant et al. | |
| 2003/0046195 A1 | 3/2003 | Mao | |
| 2003/0083961 A1 | 5/2003 | Bezos et al. | |
| 2003/0120546 A1 | 6/2003 | Cusack et al. | |
| 2003/0120579 A1 | 6/2003 | Carter, III | |
| 2003/0130883 A1 | 7/2003 | Schroeder et al. | |
| 2003/0158791 A1 | 8/2003 | Gilberto et al. | |
| 2003/0172007 A1 | 9/2003 | Helmolt et al. | |
| 2003/0200156 A1 | 10/2003 | Roseman et al. | |
| 2003/0212617 A1 | 11/2003 | Stone et al. | |
| 2003/0216969 A1 | 11/2003 | Bauer et al. | |
| 2003/0229502 A1 | 12/2003 | Woo | |
| 2004/0019494 A1 | 1/2004 | Ridgeway et al. | |
| 2004/0098358 A1 | 5/2004 | Roediger | |
| 2004/0117377 A1 | 6/2004 | Moser et al. | |
| 2004/0162763 A1 | 8/2004 | Hoskin et al. | |
| 2004/0186783 A1 | 9/2004 | Knight et al. | |
| 2004/0210542 A1 | 10/2004 | Sweeney | |
| 2004/0220861 A1 | 11/2004 | Morciniec et al. | |
| 2004/0267674 A1 | 12/2004 | Feng et al. | |
| 2004/0267676 A1 | 12/2004 | Feng et al. | |
| 2005/0055283 A1 | 3/2005 | Zarovinsky | |
| 2005/0060270 A1 | 3/2005 | Ramakrishnan | |
| 2005/0075949 A1 | 4/2005 | Uhrig et al. | |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0218218 A1 | 10/2005 | Koster | |
| 2006/0036507 A1 | 2/2006 | Pujar et al. | |
| 2006/0112099 A1 | 5/2006 | Musgrove et al. | |
| 2006/0143027 A1 | 6/2006 | Jagannathan et al. | |
| 2006/0190308 A1 | 8/2006 | Janssens et al. | |
| 2007/0226064 A1 | 9/2007 | Yu et al. | |

FOREIGN PATENT DOCUMENTS

| | | |
|---|---|---|
| WO | WO-02/13101 A1 | 2/2002 |

OTHER PUBLICATIONS

"Beyond Markdown Management", summer/autumn 03, the 4caster, Issue 4, vol. 2, 4 pages.

"Retailers Manage Markdown Challenges Using i2 Solutions", Jan. 13, 2003, NFR 92nd Annual Convention & Expo, 2 pages.

Abraham et al., "An Implemented System for Improving Promotion Productivity Using Store Scanner Data", Marketing Science, Summer 1993, vol. 12, No. 3, pp. 248-269.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Subrahmanyan et al., "Developing optimal pricing and inventory policies for retailers who face uncertain demand", Journal of Retailing, vol. 72, No. 1, Spring, 1996, 15 pages.

"Manugistics Announces Powerful Markdown Optimization Solution for Retailers", Business Wire, Jun. 10, 2003, 5 pages.

"ProfitLogic Launches ProfitLogic 2004: An Expanded Merchandise Optimization Suite Designed to Help Retailers Make More Profitable Merchandising Decisions", InternetRetailer.com, Jan. 12, 2004, 2 pages.

"SAS Acquires Marketmax", Outsourced-logistics.com, Oct. 13, 2003, 3 pages.

"There Goes the Rainbow Nut Crunch", BusinessWeek.com, Jul. 19, 2004, 3 pages.

Baxter, John, "Operational Research in Retailing", Operational Research Quarterly, Sep. 1951, vol. 2, No. 3, 5 pages.

Boyles, Carolee, "Uncover Slow-Selling Inventory-Outdoor Marketplace", Shooting Industry, Feb. 2003, 2 pages.

Kelkar et al., Price Modeling in Standards for Electronic Product Catalogs Based on XML, 2002, pp. 366-375.

Lee, Calvin B., Ph.D., "Demand Chain Optimization: Pitfalls and Key Principles", NONSTOP's "Supply Chain Management Seminar" White Paper Series, 2002, 27 pages.

Mantrala et al., "A Decision-Support System That Helps Retailers Decide Order Quantities and Markdowns for Fashion Goods", Interfaces, vol. 31, No. 3, 2001, pp. S146-S165.

Notice of Allowance for U.S. Appl. No. 11/074,586, mail date Feb. 4, 2008, 4 pages.

Office Action for U.S. Appl. No. 10/900,970, mail date Oct. 1, 2009, 24 pages.

Office Action for U.S. Appl. No. 10/900,970, mail date Feb. 25, 2008, 19 pages.

Office Action for U.S. Appl. No. 10/900,970, mail date Apr. 20, 2009, 24 pages.

Office Action for U.S. Appl. No. 10/900,970, mail date Aug. 27, 2007, 13 pages.

Office Action for U.S. Appl. No. 10/900,970, mail date Sep. 17, 2008, 22 pages.

Office Action for U.S. Appl. No. 10/926,847, mail date Oct. 17, 2007, 11 pages.

Office Action for U.S. Appl. No. 10/926,847, mail date Oct. 28, 2008, 13 pages.

Office Action for U.S. Appl. No. 10/926,847, mail date Apr. 18, 2008, 14 pages.

Office Action for U.S. Appl. No. 10/926,847, mail date Jun. 9, 2009, 19 pages.

Office Action for U.S. Appl. No. 10/926,847, mail date Sep. 23, 2009, 18 pages.

Office Action for U.S. Appl. No. 10/927,537, mail date Oct. 17, 2007, 11 pages.

Office Action for U.S. Appl. No. 10/927,537, mail date Nov. 26, 2008, 13 pages.
Office Action for U.S. Appl. No. 10/927,537, mail date May 6, 2008, 8 pages.
Office Action for U.S. Appl. No. 10/927,537, mail date Jul. 17, 2009, 61 pages.
Office Action for U.S. Appl. No. 10/927,646, mail date Oct. 5, 2009, 11 pages.
Office Action for U.S. Appl. No. 10/927,646, mail date Oct. 8, 2008, 13 pages.
Office Action for U.S. Appl. No. 10/927,646, mail date Apr. 15, 2009, 30 pages.
Office Action for U.S. Appl. No. 10/985,741, mail date Jan. 6, 2009, 16 pages.
Office Action for U.S. Appl. No. 10/985,741, mail date Nov. 1, 2007, 9 pages.
Office Action for U.S. Appl. No. 10/985,741, mail date Jun. 25, 2008, 12 pages.
Office Action for U.S. Appl. No. 10/985,741, mail date Jun. 25, 2009, 23 pages.
Office Action for U.S. Appl. No. 11/074,586, mail date Nov. 2, 2007, 11 pages.
Office Action for U.S. Appl. No. 11/074,586, mail date May 15, 2007, 9 pages.
SAS (R) Markdown Optimization, 2004, Flyer (Please see Office Action of References Cited for U.S. Appl. No. 10/900,970, dated Apr. 20, 2009—Reference was not provided by Examiner).
Srinivasan et al., "Concepts and Strategy Guidelines for Designing Value Enhancing Sales Promotions", Journal of Product and Brand Management, vol. 7, No. 5, 1998, pp. 410-420.
Office Action for U.S. Appl. No. 10/927,537, mail date Mar. 3, 2010, 50 pages.
Office Action for U.S. Appl. No. 10/985,741, mail date Jan. 21, 2010, 28 pages.

* cited by examiner

705 — Set type: Organisation

| Org. set | Description | Default set |
|---|---|---|
| OS1 | Region North | X |
| OS2 | Region East | |
| OS3 | Region South | |

Tabs: Head | Budget mon | Org. sets

710

| Article | Sales unit | SalesOrg | DistCh | Pr list | Site | New retail pr |
|---|---|---|---|---|---|---|
| 4713 | PC | V001 | V1 | | | 15,99 |
| 4713 | PC | V001 | V1 | P1 | | 13,99 |
| 4713 | PC | V001 | V1 | P2 | | 13,99 |
| 4713 | PC | V001 | V1 | | F001 | 12,99 |

Overview

ORGANIZATIONAL SETTINGS FOR A PRICE PLANNING WORKBENCH

CROSS-REFERENCE TO RELATED PATENT APPLICATIONS

This application is a continuation of prior application Ser. No. 11/074,586, filed Mar. 8, 2005, entitled "Organizational Settings For A Price Planning Workbench", which claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," all of which are hereby incorporated by reference in their entireties.

BACKGROUND OF THE INVENTION

The present invention relates generally to the field of methods and systems for implementing price planning. More particularly, the present invention relates to methods and systems for implementing price planning based upon organizational settings.

Within a retail sales organization, price planning schedules may be generated and implemented to set prices for all of the locations within the organization to facilitate consistent ease of use in price setting. However, different subgroups within an organization may require unique price settings according to their unique circumstances. For example, one region may experience particularly stiff competition and accordingly need to have more aggressive pricing strategies to compete. Another region may be subject to a regional tax that must be incorporated into the prices defined for articles that are being sold. Accordingly, although prices may need to be set generally for ease and consistency, it is often necessary to generate special pricing for subsets within an organization.

Subsets within an organization may be defined according to an organization setting. Each organization setting may include retail locations, groups of retail locations, or any other group according to the particular needs and structure of the organization. Each organization setting may further be defined according to the pricing issues defined above. However, these pricing issues lower the ease of implementation and consistency for a pricing system used by the organization.

Thus, there is a need for an automated system and method enabling users to define organization settings to be used in a price planning system. There is further a need for such a system and method configured to allow users to set a default pricing level for articles sold by the organization. In addition, there is a need for a system and method configured to allow the user to define a unique pricing level according to organization settings defining groups within the organization.

SUMMARY OF THE INVENTION

One embodiment of the invention relates to a method for defining a price planning schedule according to one or more organization settings. The method includes receiving a first organization setting for at least one article. The first organization setting is configured to be a default organization setting. The method also includes receiving a pricing level for the first organization setting for the at least one article and receiving at least a second organization setting for the at least one article. Further, the method includes receiving a second pricing level for the second organization setting and generating a first price planning schedule based on the first organization setting and the second organization setting for the at least one article. The method also includes receiving a pricing signal from a slow seller management system and adjusting at least one of the pricing level and the second pricing level based on the pricing signal. The method includes generating a second price planning schedule based on adjusting at least one of the pricing level and the second pricing level.

Another embodiment of the invention relates to a system for generating a price planning schedule. The system includes an organization setting interface configured to receive definitions for a plurality of organization settings. Each organization setting includes an exclusive collection of articles associated with that organization setting. The system includes a price planning workbench configured to generate a first price planning schedule based on the plurality of organization settings for articles associated with each organization setting and a slow seller management system configured to transmit a pricing signal to the price planning workbench. The price planning workbench is configured to generate a second price planning schedule based on the pricing signal.

Yet another embodiment of the invention relates to a program product for generating a price planning schedule, comprising machine-readable program code for causing, when executed, one or more machines to perform the following method steps. The steps include receiving a default organization setting for at least one article. The first organization setting is configured to be a default organization setting. The steps also include receiving a pricing level for the first organization setting for the at least one article and receiving at least a second organization setting for the at least one article. The steps further include receiving a second pricing level for the second organization setting and generating a first price planning schedule based on the first organization setting and the second organization setting for the at least one article. The steps include receiving a pricing signal from a slow seller management system and adjusting at least one of the pricing level and the second pricing level based on the pricing signal. The steps also include generating a second price planning schedule based on adjusting at least one of the pricing level and the second pricing level.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 5 is an article detail interface 700 configured to allow a user to view and modify organizational levels for a specific article, according to an exemplary embodiment.

DETAILED DESCRIPTION OF THE PREFERRED EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and devices are shown in diagram form in order to facilitate description of the exemplary embodiments.

In at least one exemplary embodiment illustrated below, a computer system is described which has a central processing unit ("CPU") that executes sequences of instructions contained in a memory. More specifically, execution of the sequences of instructions causes the CPU to perform steps, which are described below. The instructions may be loaded into a random access memory ("RAM") for execution by the CPU from a read-only memory ("ROM"), a mass storage device, or some other persistent storage. In other embodiments, multiple workstations, databases, process, or computers can be utilized. In yet other embodiments, hardwired circuitry may be used in place of, or in combination with, software instructions to implement the functions described. Thus, the embodiments described herein are not limited to any particular source for the instructions executed by the computer system.

Figure 1:
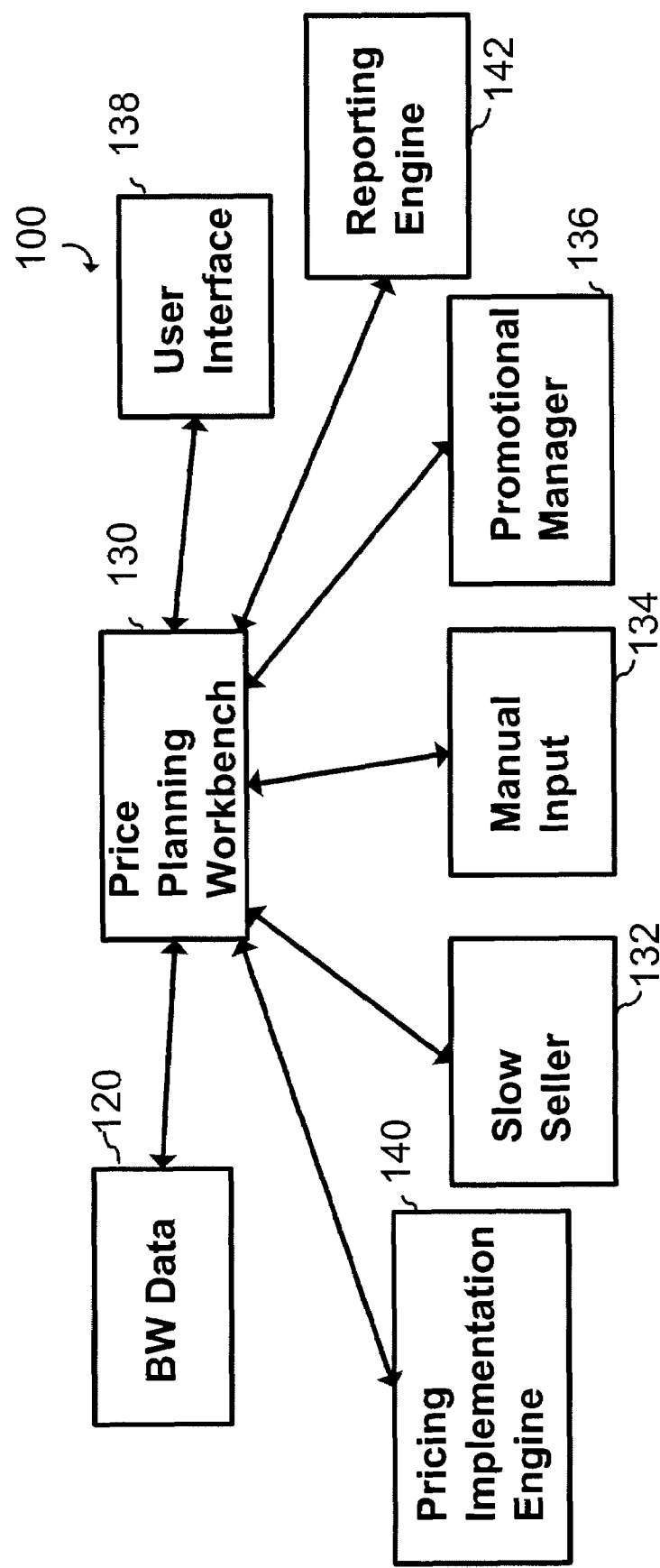
FIG. 1 is a general block diagram illustrating an exemplary embodiment of a retail planning system 100 for processing data related to retail operations and planning, according to an exemplary embodiment.

Referring now to FIG. 1, a general block diagram illustrates an exemplary embodiment of a retail planning system 100 for processing data related to retail operations and planning. Retail planning system 100 includes a data warehouse 120 and a price planning workbench 130.

According to the exemplary embodiment, retail planning system 100 may include additional components configured to manage and implement price planning for retail store operations. For example, retail planning system 100 may further include additional components such as a procurement engine, a supply engine, a merchandise controlling engine, a valuation engine, etc. The components of retail planning system 100 may further be interconnected such that information may be freely exchanged between the components of retail planning system 100.

Retail planning system 100 may further be associated with one or more additional external components such as a plurality of cash register systems associated with retail store locations. The cash register systems may be configured to perform a number of functions associated with retail store operation such as pricing implementation, inventory control, data management, etc.

Retail planning system 100 may be implemented as a single system, a distributed system, or any combination thereof. Retail planning system 100 may be implemented using a single computing system, a plurality of computing systems, software, hardware, or any other system or combination of systems to perform the functions described herein. Further, the components associated with retail planning system 100 may also be implemented using single or multiple systems.

Data warehouse 120 is a data repository configured to receive, sort, and process information related to retail operations and planning Data warehouse 120 may also be implemented using single or multiple systems. Data warehouse 120 may further include one or more functions associated with it to permit a user to efficiently organize and retrieve stored data. It may also contain historical data on products and services such as past sales and prices. Data warehouse 120 is an end-to-end data warehouse that provides functionality for the sharing of data and analysis tools to utilize the stored data. Preferably, data warehouse 120 is a SAP Business Information Warehouse (SAP BW™) provided by SAP.

Price planning workbench 130 is preferably a data processing system or software configured to control, display, interface with operators, or perform other operations to generate a price planning schedule. Although workbench 130 is preferably implemented in an SAP based workbench, interface, and architecture, any other system may be utilized.

Price planning workbench 130 is a data processing system configured to allow a user to perform pricing tasks (e.g., receive price planning input data, access applicable budgeting data, generate a price planning schedule, implement the price planning schedule, etc.) as will be further described below with reference to FIGS. 2-5. According to an exemplary embodiment, price planning workbench 130 includes a slow seller management engine 132, a manual pricing engine 134, a promotion management engine 136, a user interface 138, a pricing implementation engine 140, and a reporting engine 142.

A price planning schedule may be implemented by a data structure configured to contain information related to one or more price changes. The price changes may include a price change by specifying a new sales price, a percentage change based on the original or current sales price, or an absolute price change by specifying a difference from the original or current sales price. Further, the price planning schedule may include other information associated with the price change such as timing information (e.g., validity dates), quantity limits, automatic versus manual implementation, associated articles, etc. The price planning schedule may further include one or more results based on the price changes included in the price planning schedule. The one or more results may be actual results based on the scheduled price changes and/or predicted results.

Price planning workbench 130 is generally configured to enable a user to take corresponding budget and/or other values affected by price changes into account in planning and activating price changes to create a price planning schedule based on pricing input information. Exemplary values that may be affected by price changes include sales and stock quantities, prices, price reductions (rebates and discounts), units, profit margins, etc.

During the creation of the price planning schedule, an initial budget planning value may be created representing an effect on the corresponding budget. The initial budget planning value may be generated within data warehouse 120 based on budget utilization from prior periods, as well as the budget for the current period. Subsequently, upon activation of the price changes during defined validity dates, the corresponding budget may be updated based upon actual sales occurring under the price planning schedule and/or forecasted sales. During the updating process, the initial budget planning value may be compared with a budget usage resulting from implementation of the price planning schedule and involved article quantities. Advantageously, implementing a price planning schedule in conjunction with a corresponding budget enables cost control for any price reductions.

According to another embodiment, a user interface 138 may be used to display the results of the proposed price changes contained in the price schedule on a number of values. For example, user interface 138 may display the effect of a given set of price changes on a store's profitability. Alternatively, results may be configured to be included in the generated price planning schedule.

Generally, engines 132, 134, and 136 communicate with price planning workbench 130 either directly or as a downstream process. Direct communication may include an active exchange of data during processing. Downstream processing includes processing by the engines, followed by a data transfer to workbench 130 for processing by workbench 130. Workbench 130 is configured to interface with each engine using custom information for that engine. For example, engines 132, 134, and 136 may be configured to generate information documents that are customized to each particular engine and transferred to workbench 130. According to an alternative embodiment, engines 132, 134 and 136 may be implemented as components within price planning workbench 130.

Slow seller management engine 132 may be a system configured to communicate with one or more of a budgeting system, a planning system, an inventory system, or any other systems within or in communication with system 100. According to an exemplary embodiment, slow seller management system 132 is configured to identify and recommend pricing or other strategies for products or inventory that is selling at a slower rate than forecast. Pricing strategies may include recommended markdowns to increase sales rate. Slow seller management engine 132 is discussed in further detail below with reference to FIGS. 2A and 2B.

Manual pricing engine 134 may be any system or method for generating price planning input based on manual input received from a user. According to an exemplary embodiment, a user may utilize a user interface associated with manual pricing engine 134 or user interface 138 for price planning workbench 130 to enter one or more price changes such as a new sales price, a percentage change based on the original or current sales price, or an absolute price change by specifying a difference from the original or current sales price. The user may further enter any associated information such as timing information, quantity information, store location information, etc. Manual pricing engine 134 is discussed in further detail below with reference to FIGS. 3A and 3B.

Promotion management engine 136 may be any system or method for generating price planning input based upon one or more promotions. A promotion may be a promotion associated with a particular store, a chain of stores, a particular article, a line of articles, a geographic location or region, etc. A promotion may include a price change, timing information, article information, store location, or any other information related to the promotion to be implemented. Promotion management engine 136 is discussed in further detail below with reference to FIG. 4.

User interface 138 may be any type of interface configured to allow a user to interact with price planning workbench 130 and/or any associated components such as slow seller management engine 132, manual pricing engine 134, and promotion management engine 136. Interface 138 may be configured such that each user is assigned to one or more specific budgets, which in turn are assigned to specific articles. Advantageously, user assignments may be used to define the set of articles that a user is authorized to process. Interface 138 may further be configured to display the status of a price planning schedule during any stage of preparation and/or implementation. Interface 138 is discussed in further detail below.

Pricing implementation engine 140 may be any type of system or method configured to receive a price planning schedule and communicate with one or more components associated with retail planning system 100 to implement price changes defined in the price planning schedule. Pricing implementation engine 140 may be further configured to implement functions associated with the price changes such as budgets updates, inventory tracking, etc. Pricing implementation engine 140 is discussed in further detail below.

Reporting engine 142 may be any type of system or method configured to operate in conjunction with price planning workbench 130 and user interface 138 to generate and display or otherwise provide one or more results based on proposed price changes. The one or more results may be predicted and/or actual results. For example, a predicted result may be a predicted increase in sales based on the reduction in price. Such predicted results may be generated by price planning workbench 130 based upon historical values, intelligence systems, simple formulas, and/or any other predictive formula or calculation. Actual results may include results known to occur based on the proposed price changes. For example, an actual result may include maximum sales revenue that can be generated based on stock levels and the revised prices.

According to alternative embodiments, price planning workbench 130 may include more, fewer, or different systems than described above to facilitate creation, processing, and maintenance of a price planning schedule. In addition, functions associated with one or more systems described above may alternatively be associated with one or more alternative systems. For example, manual pricing engine 134 may be implemented as a component within promotion management engine 136.

Figure 2A:
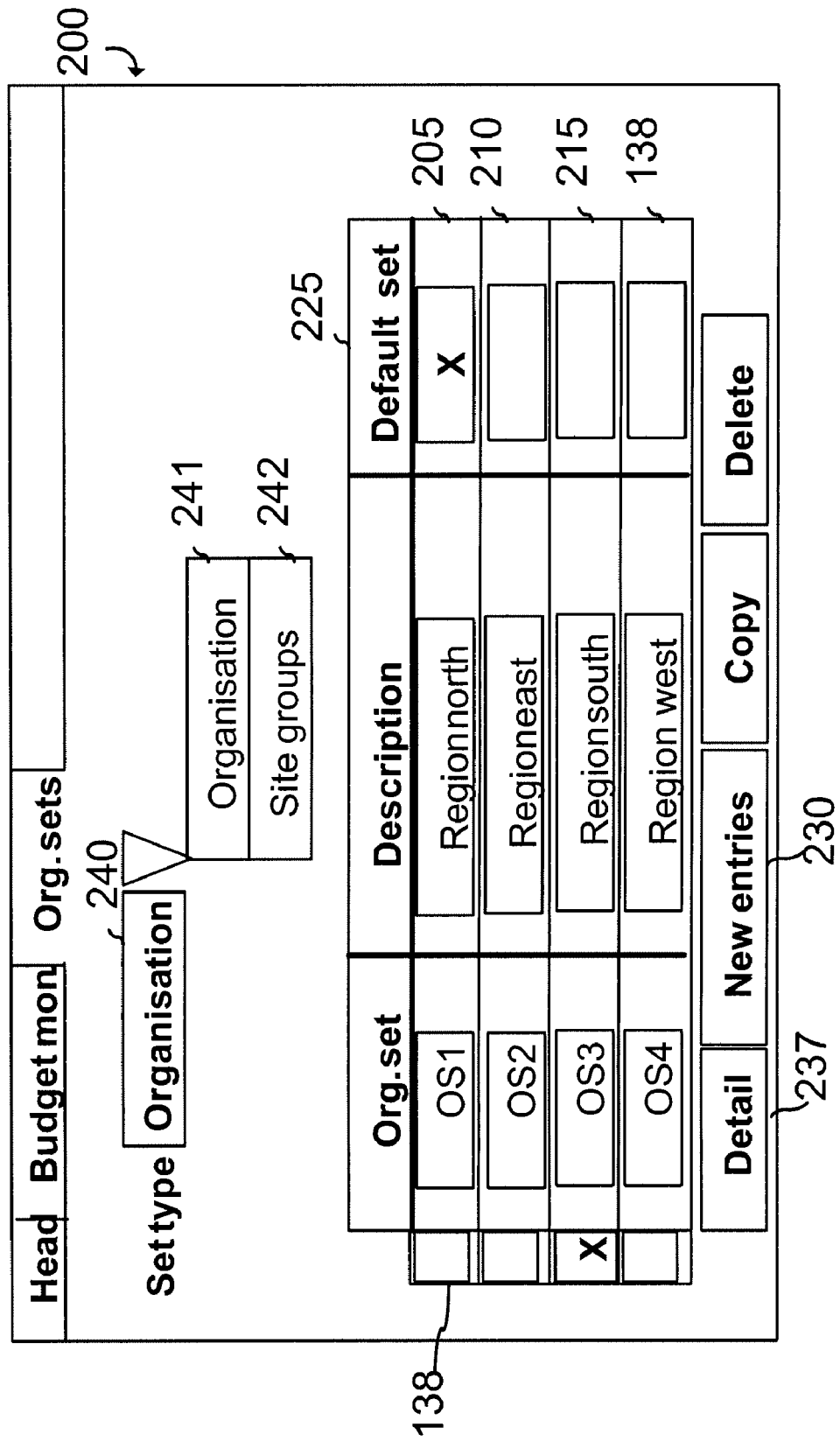
FIG. 2A is an organization settings definition interface 200 for generating pricing information for a variety of organizational levels within an organization, according to an exemplary embodiment.

Referring now to FIG. 2A, an organization settings definition interface 200 for generating pricing information for a variety of organizational levels within an organization is shown, according to an exemplary embodiment. Generating prices for retail items within the price planning workbench may be a two-dimensional analysis. The first dimension is represented by the article items. Each article may be identified by a particular article identification number, such as an SKU number. For each article item, price information is established related to that item. The second dimension is represented by the organizational level. Exemplary organizational levels include distribution chains, regional levels, etc. Groupings may be set according to any information known within an organization. The two-dimensional analysis is generated where pricing information may be associated with an article according to organizational levels as will be further discussed below.

Organizational setting definition interface 200 is a maintenance screen that allows a user to define any number of organization levels and to assign a number and textual name to each organizational level. Organizational setting definition interface 200 may be implemented using any standard type of computing device. The computing device may be a local computing device where the organizational setting definition interface 200 is a graphical user interface implemented using software on the local computing device. Alternatively, the computing device may be a networked or remote computing device, where the organizational setting definition interface 200 is a web-implemented interface. Although two possible implementations are described, those of skill in the art will recognize that organizational setting definition interface 200 may be implemented in a variety of ways using one or more computing devices.

According to an exemplary embodiment, definition interface 200 includes four organizational level definitions. A first organizational level definition 205 is labeled with an "OS1" and "Region north." A second organization level definition 210 is labeled with an "OS2" and Region east." A third organization level definition 215 is labeled with an "OS3" and "Region south." A fourth organization level definition 138 is labeled with an "OS4" and Region west." Although specific organization levels are shown and labeled, more, fewer, and/or different levels may alternatively be used.

To add a new organizational level, a user of interface 200 may click on a "new entries" button 230, to initiate the process of creating a new level. Creating a new level may include assigning groupings to the level, labeling the level, determining whether the level will utilize a default pricing list, etc.

For the price planning workbench, a single organization definition may be marked as the default organization definition in a default selection column 225 of definition interface 200. Region "OS1" is currently marked as the default region as shown in FIG. 2A, column 225. A default organization setting may be utilized when transferring new articles from an article hierarchy. All of the newly transferred articles are marked and treated as if they were assigned to the default organizational setting. Further, pricing levels from the default organizational level may be utilized in pricing every article through all of the organization setting where the article or a group the article is associated within does not include an exception price, discussed in further detail below with reference to FIG. 2B.

Using interface 200, the user may further select an organizational setting to be modified by clicking a detail button 237 after selecting an organization level. The user may select an organization setting to be modified by marking the organizational setting in a current selection column 235. As shown in FIG. 2A, Region OS3 has been marked as the current organization setting. After selecting a current organization setting, the user may click on "Details" button 237 to display an organization setting detail interface 300, further described below with reference to FIG. 2B.

Figure 2B:
FIG. 2B is an organization setting detail interface 300 illustrating details for a third organization level definition, labeled "Region South," according to an exemplary embodiment.

Referring now to FIG. 2B, organization setting detail interface 300 illustrates details for third organization level definition 215, labeled "Region South," is shown, according to an exemplary embodiment. Detail interface 300 includes a detail listing 310 of price plan levels available within the selected organization level definition.

A sales organization column 315 indicates the sales organization for which a pricing list is to be applied. A distribution chain column 320 may be used to indicate a distribution chain for which a pricing list is to be applied. According to an exemplary embodiment, detail interface 300 may be configured to only allow price planning for one distribution chain in a price plan. A distribution chain may be a regional designation, such as a Canadian distribution chain. Accordingly, the first two columns of the price plan level listing 310 is fixed and is not accessible to the user. Although only one distribution chain is described, alternative embodiments may include functionality to create price plan levels across multiple distribution chains. Further, the definition of a distribution chain may be modified to create a single distribution chain from two previous distribution chains. Similarly, a single former distribution chain may be divided into two distribution chains.

A price list column 325 may be used to indicate a price list to be used for a sub-region, such as a state or territory with a country. Column 325 may be configured to receive the designation of the price list that is to be used for the sub-region. For example, as shown in FIG. 2B, a first sub-region may have prices set according to a first sub-region pricing list 326, labeled "P1", while a second sub-region may have prices set according to a second sub-region pricing list 327, labeled "P2".

A site listing column 330 may be used to indicate a price list to be used for a sub-sub-region, such as a city or specific location within a sub-region. Column 330 may be configured to receive the designation of the price list that is to be used for the site. For example, as shown in FIG. 2B, a site may have prices set according to a site pricing list 331, labeled "F001".

Each row of price plan level listing 310 represents a different level within the organization for which a price listing has been created. The exemplary price plan level listing 310 in FIG. 2A illustrates an example where a price plan includes one general price, two different sub-region prices, and one specific site price.

Referring again to FIG. 2A, in header area of FIG. 1, a drop down menu 240 is provided which has two different selections, according to an exemplary embodiment. A first selection 241 is an organization selection, a second selection 242 is a site group selection.

According to an exemplary embodiment, a user of interface 200 may select to generate pricing list according to either organization levels as shown and described above with reference to FIGS. 2A-2B, or may generate pricing list according to one or more site groups. Selecting second selection 242 within interface 200 will allow a user to generate pricing information according to one or more site groups. Where second selection 242 is selected on interface 200, a site interface 400 will be displayed.

Figure 3A:
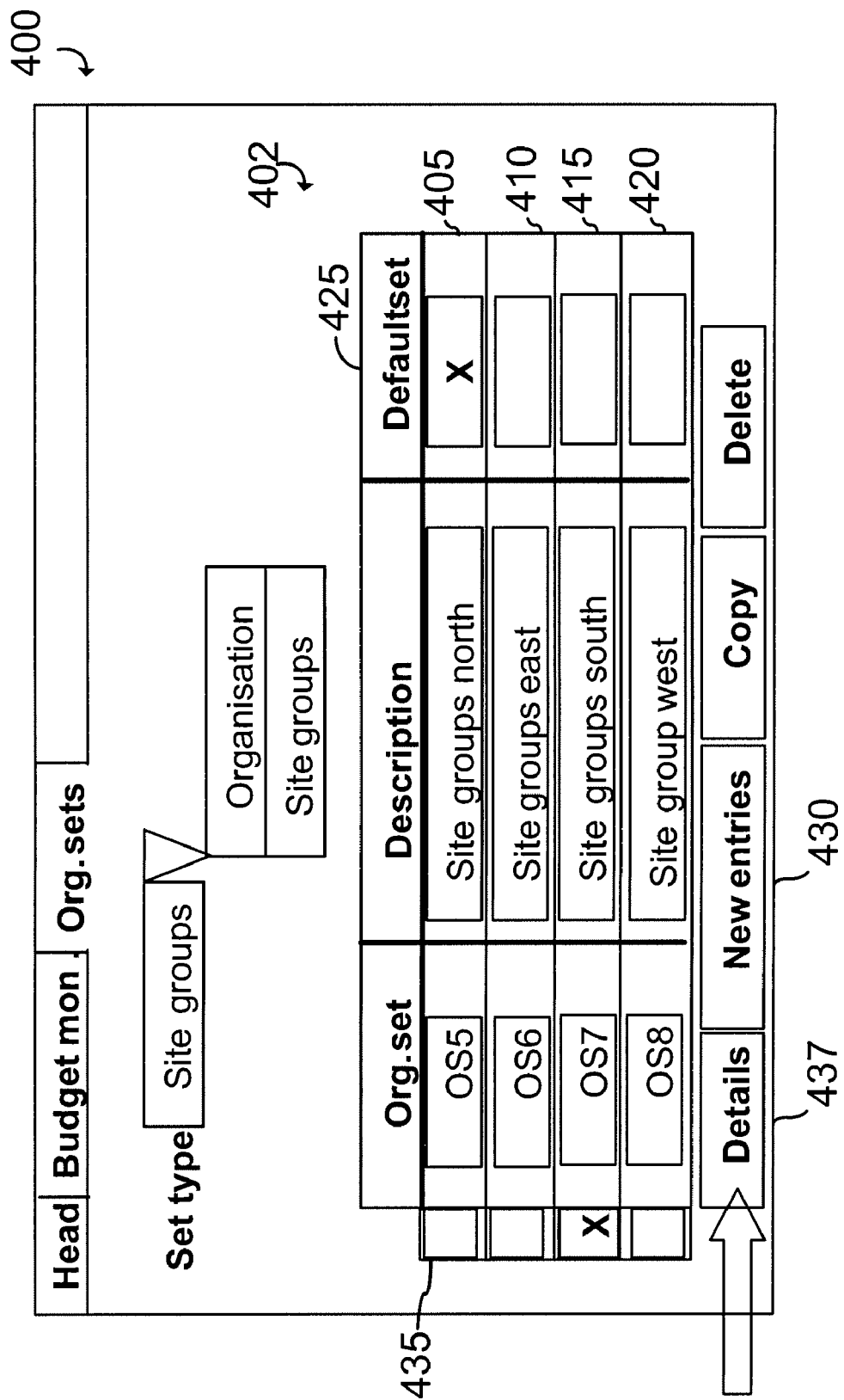
FIG. 3A is a site setting definition interface 400, configured to allow a user to generate pricing lists for one or more sites, according to an exemplary embodiment.

Referring now to FIG. 3A, site setting definition interface 400, configured to allow a user to generate pricing lists for one or more sites is shown, according to an exemplary embodiment. At the retail level, a site represents the store of the retailer, or grouping of stores, referred to herein as a site group. A site group may be selected according to any criteria desired. For example, a site group may be created that includes stores that are selected based on the demographic of a population that lives proximate to the store. The site groups do not need to be hierarchical according to regions, etc. and further may be overlapping.

Site setting definition interface 400 includes a listing 402 of created site definitions. A first site definition 405 is labeled with an "OS5" and "Site groups north". A second site definition 410 is labeled with an "OS6" and "Site groups east". A third site definition 415 is labeled with an "OS7" and "Site groups south". A fourth site definition 420 is labeled with an "OS8" and "Site groups west". Although specific sites are shown and labeled, more, fewer, and/or different sites may alternatively be used.

To add a new site, a user of interface 400 may click on a "new entries" button 430, to initiate the process of creating a new level. Creating a new level may include assigning groupings to the level, labeling the level, determining whether the level will utilize a default pricing list, etc.

For the price planning workbench, a single organization definition may be marked as the default organization definition in a default selection column 425 of definition interface 400. Site "OS5" is currently marked as the default region as shown in FIG. 3A, column 425. A default site setting may be utilized when transferring new articles from an article hierarchy. All of the newly transferred articles are marked and treated as if they were assigned to the default site setting. Further, pricing levels from the default site may be utilized in pricing every article through all of the sites where the article or a group the article is associated with that does not include a price according to another setting, discussed in further detail below with reference to FIG. 4.

Using interface 400, the user may further select a site group to be modified. The user may select an organization setting to be modified by marking the organizational setting in a current selection column 435. As shown in FIG. 3A, Organizational Setting "OS7" has been marked as the current organization setting. After selecting a current organization setting, the user may click on a "Details" button 437 to display a site detail interface 500, further described below with reference to FIG. 3B.

Figure 3B:
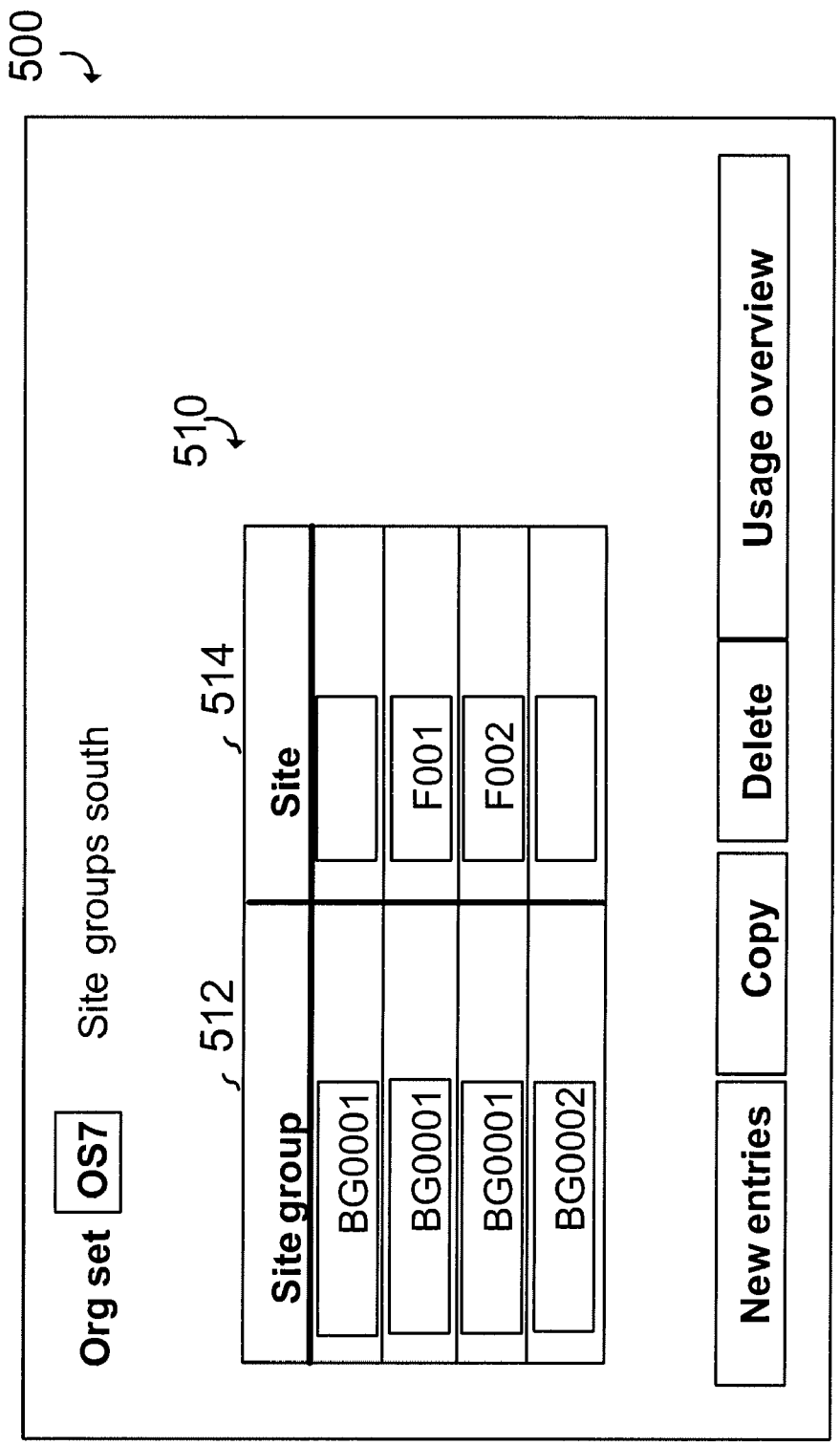
FIG. 3B is a site detail interface 500 configured to allow a user to indicate that one or more particular sites within a selected site group will receive a unique pricing list is shown, according to an exemplary embodiment.

Referring now to FIG. 3B, a site detail interface 500 configured to allow a user to indicate that one or more particular sites within a selected site group will receive a unique pricing list is shown, according to an exemplary embodiment. Site detail interface 500 includes a site group listing 510 containing site groups that were selected in column 435 of interface 400. Site group listing 510 includes a site group name column 512 and a site price list column 514. For each site group in listing 510, the user may specify that a particular site should be treated in a particular manner. For example, in site price list column 512, if it is blank, price planning will be done at the site group level according to the default site selected in interface 400. However, if a number, indicative of a price list to be used for that site group, is placed within the column 510, the site group corresponding with that number will be individually planned.

Figure 4:
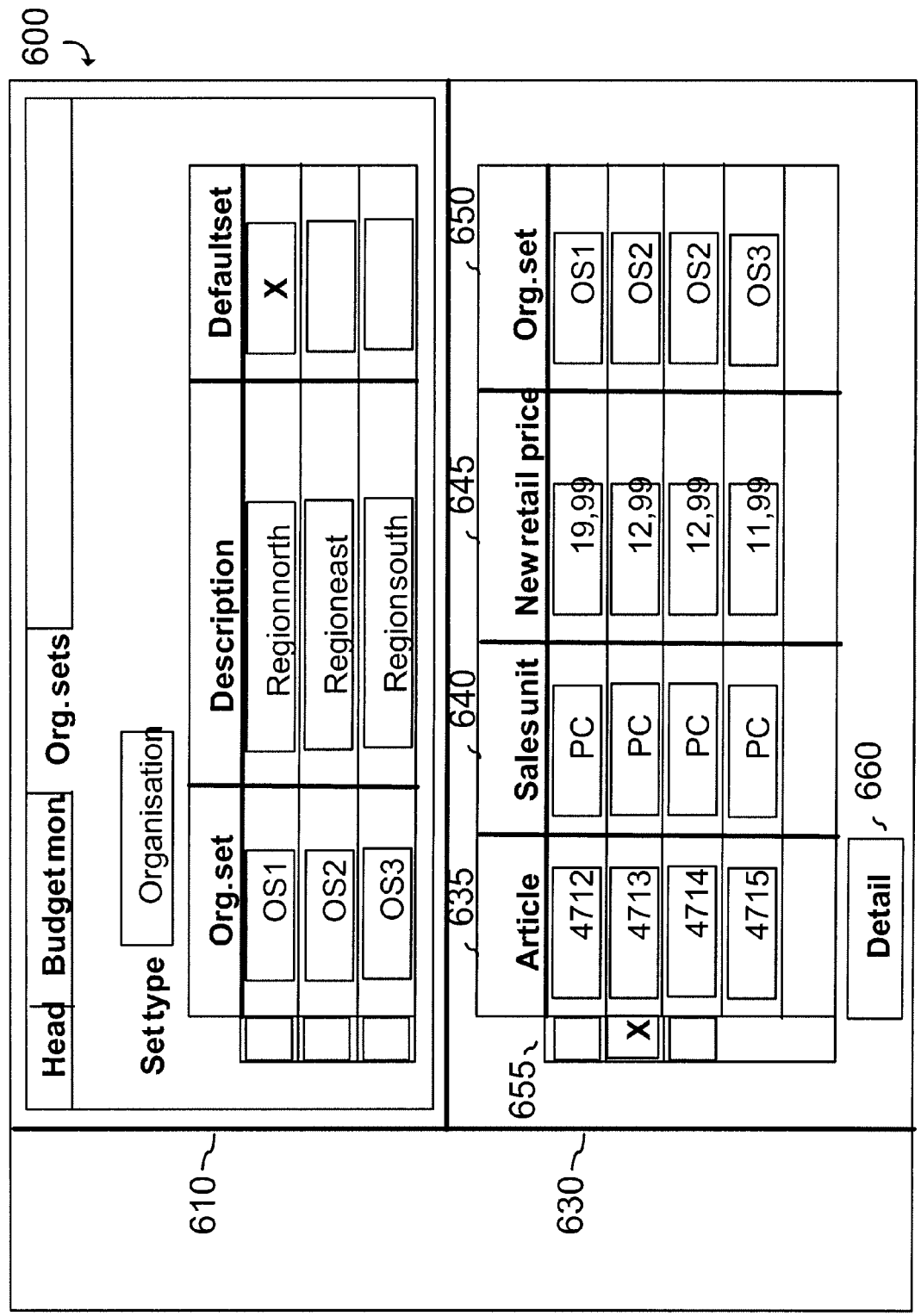
FIG. 4 is an article assignment interface 600 configured to allow a user to assign prices to articles in the defined organizational levels associated with that article, according to an exemplary embodiment.

Referring now to FIG. 4, an article assignment interface 600 configured to allow a user to assign prices to articles in the defined organizational levels associated with that article is shown, according to an exemplary embodiment. After the organization levels have been defined using the organizational or site definition interfaces a user may access details associated with either the site definition or organization level by clicking on detail button 237 or 437, described above with reference to FIGS. 2A and 3A.

Interface 600 includes a header area 610 and an item area 630. Header area 610 is configured to display either organizational or site levels, depending on which field was selected in menu 240 of interface 200. A user may select an organizational or site level for which articles and prices are to be assigned. Item area 630 contains articles selected by the user. The articles may be selected from using any standard means, such as selecting based on search results, selecting from an article hierarchy tree, etc. Accordingly, interface 600 may be configured to include an additional frame, not shown that includes search results or an article hierarchy tree from which users may "drag and drop" articles into item area 630. Assignments of article function similarly independent of whether a site or organizational level is being used for the assignments.

Item area 630 includes a listing of articles including an article identifier column 635, a sales unit column 640, a retail price column 645, and an organization level assignment column 650. The article identifier column 635 includes a listing of article identifiers, in particular the article number. The sales unit column 640 includes a listing of the sales unit that the article identified by the article number is associated with. According to an exemplary embodiment, the sales unit may be automatically populated and fixed, such that it cannot be modified by a user.

Retail price column 645 includes a retail price column 645 listing the retail price associated with the listed article according to the organization level displayed in column 650. The retail price may be set by a user allowing the user to define what prices are to be used for the article at each of the various organizational levels. The user may make the assignment, i.e. article 4712, is assigned to the OS1 organizational setting and has a retail price of $19.99.

Although specific articles are shown associated with a single organizational level, it is important to note that a single article may be associated with multiple organizational levels with a unique retail price for each organization level. To access the details for an article and the organizational level with which it is associated a user may chose that article in a selection column 655 and click a details button 660 to display an article details interface 700, described below with reference to FIG. 5.

Referring now to FIG. 5, an article detail interface 700 configured to allow a user to view and modify organizational levels for a specific article is shown, according to an exemplary embodiment. Article detail interface 700 includes a header area 705 and an item detail area 710. Header area 705 is similar to header area 610, described above with reference to FIG. 4.

Item area 710 is configured to allow a user to display all of the organizational levels or site levels and their associated price levels for a particular article. A user may modify one or more fields within item area 710 to change the retail prices associated with the articles at each of the organizational levels or site definitions.

Organizational levels and or site levels are organization settings configured to allow the user to define groups within an organization. These organizational settings may be defined according to any criteria desired by the user. Exemplary criteria include, but are not limited to, regional hierarchies, article hierarchies, specific site locations, etc.

Although the terms "article," "product," "retail product," and "inventory" are used herein to refer to the merchandise being sold, the present description will be applicable to the sale of any type of good or service. In either case, the pricing for merchandise being sold and/or services may be controlled or affected by the price planning workbench as described above.

As noted above, embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. Computer-readable media comprising instructions stored therein, when executed, cause one or more processors to implement a method for defining a price planning schedule according to one or more organization settings, the method comprising:
   receiving a first organization setting for at least one article, the first organization setting configured to be a default organization setting;
   receiving a pricing level for the first organization setting for the at least one article;
   receiving at least a second organization setting for the at least one article;
   receiving a second pricing level for the second organization setting;
   generating a first price planning schedule based on the first organization setting and the second organization setting for the at least one article;
   receiving a pricing signal from a slow seller management system;
   adjusting at least one of the pricing level and the second pricing level based on the pricing signal; and
   generating a second price planning schedule based on adjusting at least one of the pricing level and the second pricing level.

2. The computer-readable media of claim 1, wherein at least one of the first organization setting and the second organization setting is defined based on a region of sales activity.

3. The computer-readable media of claim 1, wherein at least one of the first organization setting and the second organization setting is defined based on a specific store location.

4. The computer-readable media of claim 1, wherein the second organization setting is configured to be adjusted based on the output from one of a pricing implementation engine, a manual input engine, or a promotional management engine.

5. The computer-readable media of claim 1, wherein the second organization setting defines a subset of the first organization setting.

6. The computer-readable media of claim 1, further comprising transmitting the second price planning schedule to at least one retail location to adjust at least one product price.

7. The computer-readable media of claim 1, further comprising adjusting a price planning budget based on the second price planning schedule.

8. A system for generating a price planning schedule, comprising:
   an organization setting interface configured to receive definitions for a plurality of organization settings, wherein each organization setting includes an exclusive collection of articles associated with that organization setting;
   a price planning workbench configured to generate a first price planning schedule based on the plurality of organization settings for articles associated with each organization setting; and
   a slow seller management system configured to transmit a pricing signal to the price planning workbench;
   wherein the price planning workbench is configured to generate a second price planning schedule based on the pricing signal.

9. The system of claim 8, wherein at least one of the plurality of organization settings is an organization level based on a region of sales activity.

10. The system of claim 8, wherein at least one of the plurality of organization settings is an organization level based on a specific store location.

11. The system of claim 8, wherein at least one of the plurality of organization settings is configured to be adjusted based on an output from at least one of a pricing implementation engine, a manual input engine, or a promotional management engine.

12. The system of claim 8, wherein at least one of the plurality of organization settings is a subset of at least one of the plurality of organization settings.

13. The system of claim 8, wherein the price planning workbench is configured to transmit the second price planning schedule to at least one retail location to adjust at least one product price.

14. A program product for generating a price planning schedule, comprising machine-readable program code for causing, when executed, one or more machines to perform the following method steps:

receiving a first organization setting for at least one article, the first organization setting configured to be a default organization setting;

receiving a pricing level for the first organization setting for the at least one article;

receiving at least a second organization setting for the at least one article;

receiving a second pricing level for the second organization setting;

generating a first price planning schedule based on the first organization setting and the second organization setting for the at least one article;

receiving a pricing signal from a slow seller management system;

adjusting at least one of the pricing level and the second pricing level based on the pricing signal; and generating a second price planning schedule based on adjusting at least one of the pricing level and the second pricing level.

15. The program product of claim 14, wherein at least one of the first organization setting and the second organization setting is defined based on a region of sales activity.

16. The program product of claim 14, wherein the second organization setting is configured to be adjusted based on an output from one of a pricing implementation engine, a manual input engine, or a promotional management engine.

17. The program product of claim 14, wherein the second organization setting defines a subset of the first organization setting.

18. The program product of claim 14, further comprising adjusting a price planning budget based on the second price planning schedule.

19. The program product of claim 14, further comprising transmitting the second price planning schedule to at least one retail location to adjust at least one product price.

* * * * *